United States Patent
Yuen (10) Patent No.: US 7,548,617 B2
(45) Date of Patent: Jun. 16, 2009

(54) BLUETOOTH EARPHONE

(75) Inventor: Shun Ming Yuen, Millennium (HK)

(73) Assignee: Innovation Sound Technology Co., Ltd, Fuyong Town, Shenzhen (CN)

( * ) Notice: Subject to any disclaimer, the term of this patent is extended or adjusted under 35 U.S.C. 154(b) by 446 days.

(21) Appl. No.: 11/278,024

(22) Filed: Mar. 30, 2006

(65) Prior Publication Data
US 2007/0042712 A1 Feb. 22, 2007

(30) Foreign Application Priority Data
Aug. 19, 2005 (CN) ............... 2005 2 0106754 U (51) Int. Cl.
*H04M 1/00* (2006.01)
*H04M 9/00* (2006.01)
*H04R 25/00* (2006.01)
*H04B 7/00* (2006.01)

(52) U.S. Cl. .................. 379/430; 381/370; 455/41.2

(58) Field of Classification Search ......... 381/370–376, 381/378, 379; 379/430; 455/41.2, 569.1, 455/575.2
See application file for complete search history.

(56) References Cited

U.S. PATENT DOCUMENTS 7,278,734 B2 * 10/2007 Jannard et al. ............ 351/158

* cited by examiner

*Primary Examiner*—Tuan D Nguyen
(74) *Attorney, Agent, or Firm*—Global IP Services; Tianhua Gu (57) ABSTRACT

This invention relates to Bluetooth earphone. Existing Bluetooth earphones have some problems: users must wear the earphone to use it, so that the user will feel uncomfortable if the user uses the earphone for a long time. In order to solve these problems, this invention has added a speaker with larger power (i.e. 3W) and configured corresponding speaking amplifying circuit and switching circuit based on the existing Bluetooth earphones. With these new features, the user can adjust his/her Bluetooth earphone by switching different circuit so that it can work in earphone mode or speaker mode. When the Bluetooth earphone works in speaker mode, the user can hear normal voice without wearing the Bluetooth earphone. Obviously, this new invention can be used not only as a common earphone, but also as a speaker. In addition, a call identification circuit, a Bluetooth transmitting circuit and a microphone can be added to expand functions of the whole Bluetooth earphone. As a result, it can be used as a Bluetooth telephone receiver/transmitter cooperated with the fixed telephone or mobile phone.

7 Claims, 12 Drawing Sheets

BLUETOOTH EARPHONE

CROSS REFERENCE TO RELATED APPLICATION

This application claims the benefit of a Chinese patent application No. 200520106754.1 (CN), filed on Aug. 19, 2005.

FIELD OF THE INVENTION

This invention relates to Bluetooth earphone. More specifically, it relates to a Bluetooth earphone which can be used either as a common earphone or as a speaker.

BACKGROUND OF THE INVENTION

Traditional earphone is mainly wire-controlled with an audio plug at one end and at another end connected with a small loudspeaker, which is used to restore sound signal. Generally, the power of the small loudspeaker is 5-10 mW. When assembled, the small loudspeaker can be installed in the small earplug to form an in-ear earphone, and also can be installed in an earmuff to form an on-ear earphone.

With the emergence of Bluetooth technology, traditional earphone gets rid of the restriction of wire. Effective Bluetooth wireless transmission will be realized after installing Bluetooth transmitting circuit on the audio source device and Bluetooth receiving circuit in the earphone. This kind of Bluetooth earphone can effectively receive audio signal within the scope of more than 10 meters.

However, only small loudspeaker with low power is installed on either traditional wire-controlled earphone or this new Bluetooth earphone. Users can hear normal voice only when the earphone is plugged into users' ears or worn on users' ears. Otherwise, the users can not hear normal voice from the earphone. The users may feel uncomfortable after wearing the earphone for a long time with the earphone plugged into the ears or the ears pressed by the ear buffs.

SUMMARY OF THE INVENTION

Existing Bluetooth earphones have some disadvantages: existing earphone can be used only after users wear it; the user will feel uncomfortable after using the earphone for a long time. In order to solve these problems, a Bluetooth earphone which can be used either as a common earphone to wear or as a speaker is provided.

In order to solve the above technical problems, this invention provides a Bluetooth earphone, comprising left and right earmuffs, and intermediate connecting unit, also comprising power supply unit, Bluetooth receiving circuit and small loudspeakers installed in said left and right earmuffs respectively, said left and right earmuffs are electrically connected through wires installed in the connecting device, characterized in:

further comprising speaker amplifying circuit, switching circuit selectively output the input signal from the input terminal to the first or the second output terminal, and speaker installed in at least one earmuff and connected with the output terminal of the speaker amplifying circuit; the switch circuit selectively outpupt the audio signals to the small loudspeaker or the speaker amplifying circuit and the speaker amplifying circuit outputs the amplified signals to the speaker;

the output terminal of said Bluetooth receiving circuit is connected with the input terminal of said switching circuit; said first output terminal of the switching circuit is connected with said small loudspeakers and said second output terminal is connected with the input terminal of said speaker amplifying circuit.

In this invention, further comprises earphone amplifying circuit connected between each output terminal of said switching circuit and said small loudspeakers.

In this invention, preferably in said left and said right earmuffs, respectively install a speaker connected with the output terminal of said speaker amplifying circuit.

In this invention, in order to realize voice call function, further comprises a call identification circuit, connected between the output terminal of the Bluetooth receiving circuit and the input terminal of the switching circuit, utilized to identify whether there is communication signal and shield other input signals while there is a communication signal. Also, the Bluetooth earphone further comprises a Bluetooth transmitting circuit used to transmit voice signal and a microphone connected with the Bluetooth transmitting circuit.

In this invention, the power supply unit, Bluetooth receiving circuit, Bluetooth transmitting circuit, earphone amplifying circuit, speaker amplifying circuit, switching circuit and the microphone are put together in one earmuff, or installed in the left and the right earmuff separately.

According to the above solution, this invention adds a speaker with larger power and configures with corresponding speaker amplifying circuit and switching circuit, based on existing Bluetooth earphones. With these new features, the users can adjust the operating mode of the Bluetooth earphone via the switching circuit, to set the Bluetooth earphone in earphone mode or speaker mode. When the Bluetooth earphone works in speaker mode, the users can hear normal voice signals without wearing whole Bluetooth earphone. In addition, the call identification circuit, Bluetooth transmitting circuit and microphone added in the Bluetooth earphone can expand functions of the whole Bluetooth earphone, thus it can be used as a Bluetooth telephone receiver/transmitter cooperated with the fixed telephone or mobile phone.

BRIEF DESCRIPTION OF THE DRAWINGS

With attached figures and embodiments, further description to this invention will be given as follows. Among the attached figures:

FIG. 4 is the circuit diagram of the main part of the Bluetooth earphone according to one preferred embodiment of the present invention.

FIG. 6 is the circuit diagram of Bluetooth transmitter combined with FIG. 4.

DETAILED DESCRIPTION OF THE INVENTION

Figure 1:
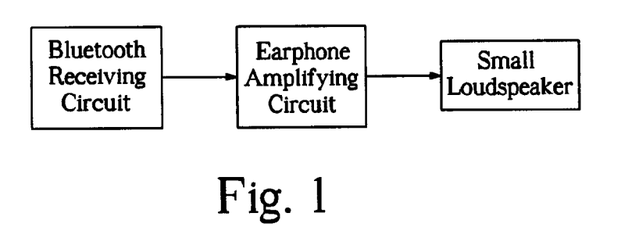
FIG. 1 is the principle block diagram of existing Bluetooth earphone.

The principle of existing Bluetooth earphone is shown in FIG. 1. In working, the Bluetooth receiving circuit is used to receive audio signals transmitted by the external Bluetooth transmitter, and convert the audio signals to analog audio signals, then send the analog audio signals to the earphone amplifying circuit to amplify, and then the amplified audio signals are output to the small loudspeakers in the earphone. Generally, the power of the small loudspeaker is 5-10 mW, thus it is only suitable to be plugged into the ears or close to the ears.

Figure 2:
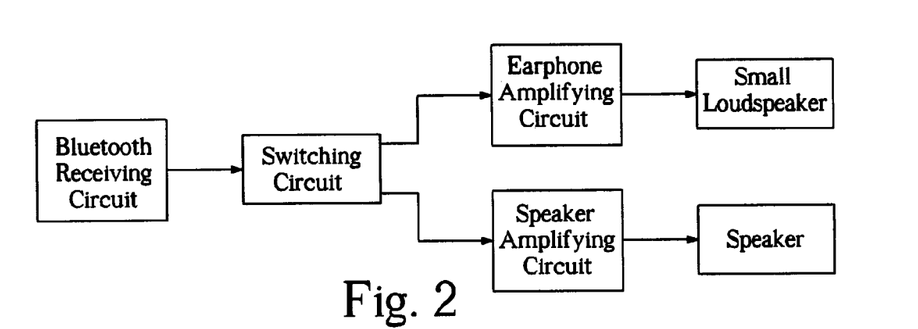
FIG. 2 is the principle block diagram of one embodiment according to the present invention.

One embodiment of the present invention is shown in FIG. 2, wherein a switching circuit, a speaker amplifying circuit and a speaker with larger power (i.e. 3W) are added to the Bluetooth earphone. In this embodiment, firstly the analog audio signals from the Bluetooth receiving circuit are output to the switching circuit. The switching circuit may selectively output the input signals from the input terminal to the first or the second output terminal. Particularly, this operation can be implemented by a double-pole-double-throw mechanical switch or a switch tube circuit, which is controlled by users to output the analog audio signals to the earphone amplifying circuit or the speaker amplifying circuit. As a result, the users can select an operating mode from the earphone mode or the speaker mode for the Bluetooth earphone through the switching circuit. When the Bluetooth earphone works in speaker mode, the audio signals are playing through the speaker, so that the users can hear normal voice without wearing the Bluetooth earphone.

Figure 3:
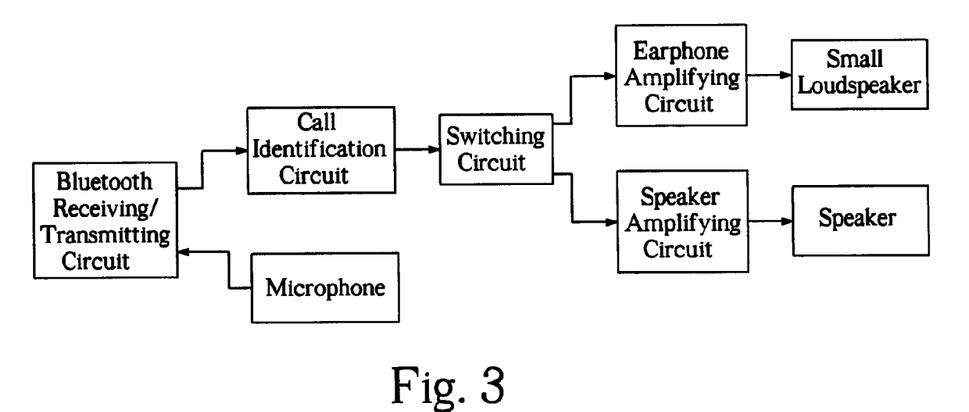
FIG. 3 is the principle block diagram of another embodiment according to the present invention.
Figure 4A:
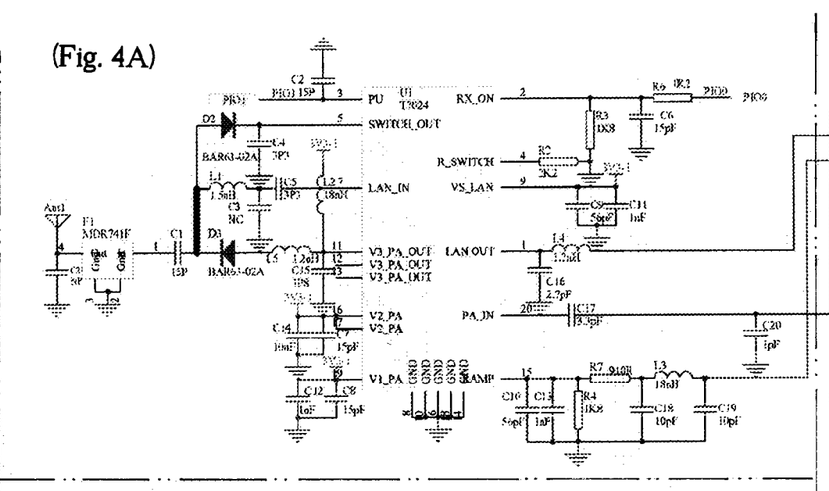
FIG. 4A is the magnified drawing of the part marked (FIG. 4A) of the FIG. 4.
Figure 4B:
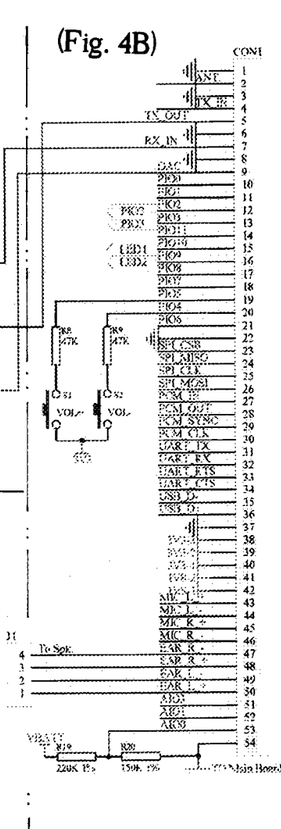
FIG. 4B is the magnified drawing of the part marked (FIG. 4B) of the FIG. 4.
Figure 4C:
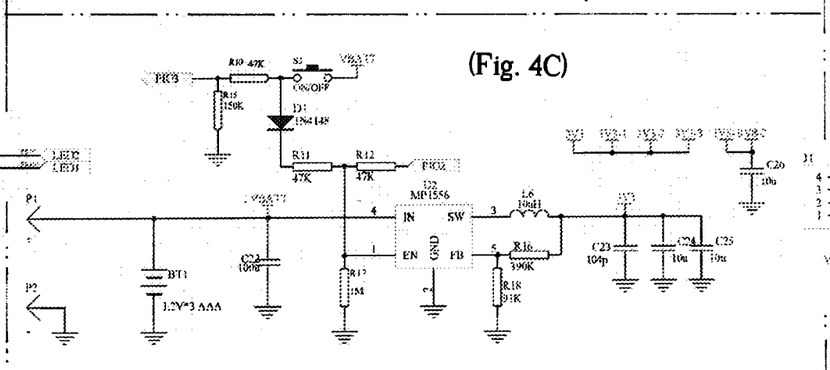
FIG. 4C is the magnified drawing of the part marked (FIG. 4C) of the FIG. 4.
Figure 4D:
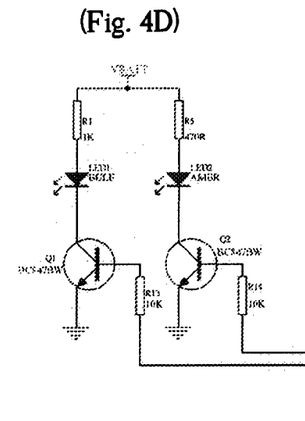
FIG. 4D is the magnified drawing of the part marked (FIG. 4D) of the FIG. 4.

As shown in FIG. 3, a call identification circuit, a Bluetooth transmitting circuit and a microphone may be added to the Bluetooth earphone shown in FIG. 2. The identification circuit is adapted to identify whether there is call communication signal and shield other input signals (e.g. music signals) when there is a call communication signal. Whether there is a call signal can be identified through the ring tone when a call is coming in, or the dial tone when dialing a call. Thereby, the Bluetooth earphone may be used as a Bluetooth telephone receiver/transmitter cooperated with the fixed telephone or mobile phone.

Figure 7:
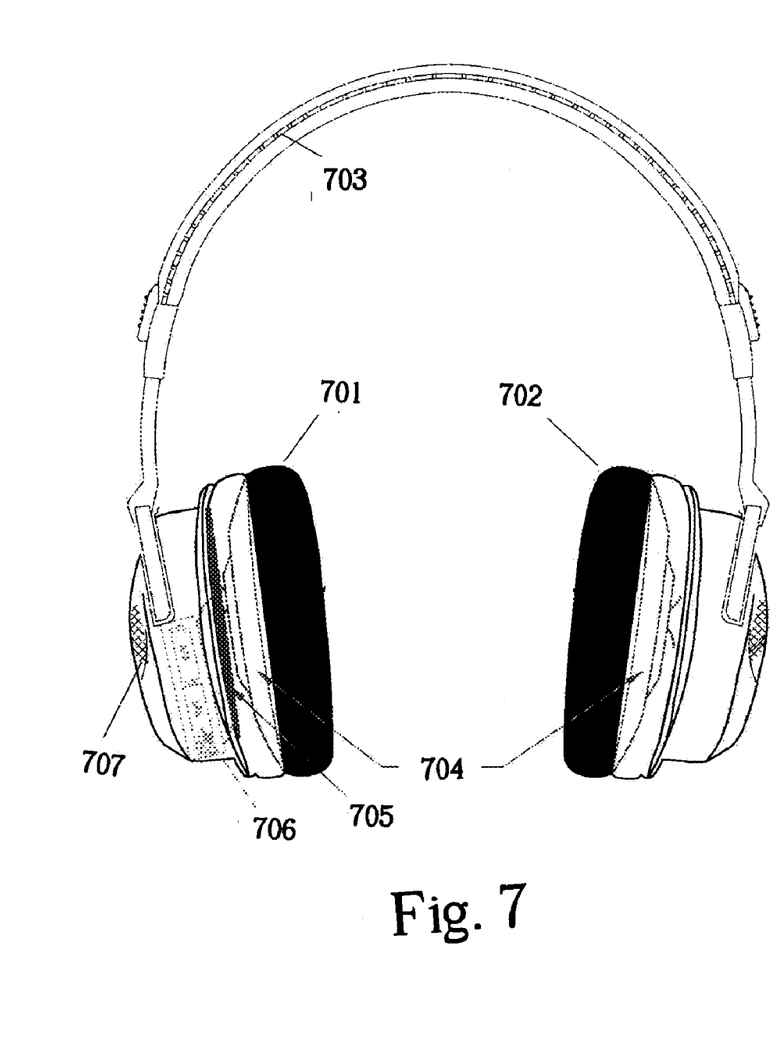
FIG. 7 is the structure sketch of the Bluetooth earphone according to a preferred embodiment of the present invention.
Figure 8:
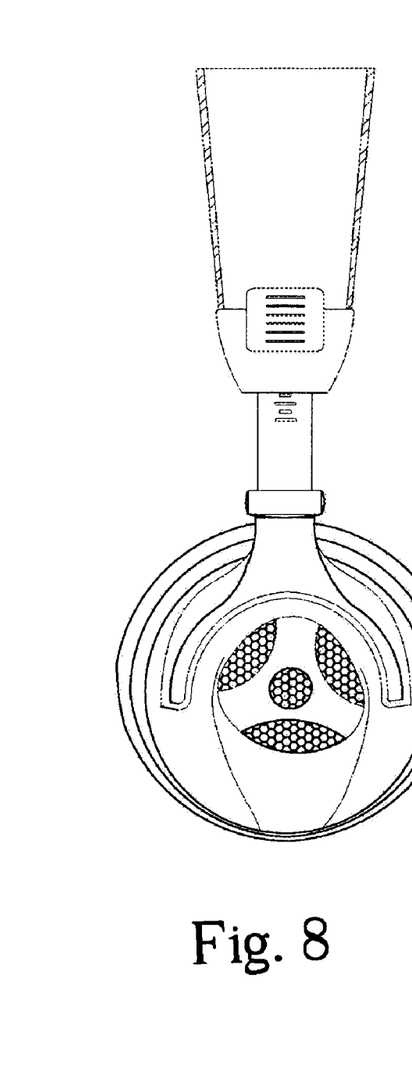
FIG. 8 is the Left view of FIG. 7.

FIG. 7 and FIG. 8 is the structure sketch of the Bluetooth earphone according to a preferred embodiment of the present invention. As shown in FIG. 7 and FIG. 8, the earphone mainly comprises left earmuff 701, right earmuff 702 and intermediate connecting unit 703. The left earmuff and the right earmuff are connected through conducting wires installed in the intermediate connecting unit. In one embodiment, the power supply unit (generally, a battery), Bluetooth receiving circuit, Bluetooth transmitting circuit, earphone amplifying circuit, speaker amplifying circuit, switching circuit and microphone are put together in an earmuff, or part of these components is installed in the left earmuff, and the remaining part is installed in the right earmuff. Two small loudspeakers utilized in earphone mode are installed in the inside of the left muff and the right earmuff respectively, and two speakers utilized in speaker mode are installed in the outside of the left earmuff and the right 10 earmuff respectively. In the embodiment shown by FIG. 7, the above mentioned circuits are collected together on a print circuit card 705; the two microphones 704 utilized in the earphone mode are installed on the insides of the right and left earmuff respectively; the two speakers utilized in speaker mode are installed on the outsides of the right and left earmuff respectively; the battery 706 is installed in the left earmuff 701.

Figure 5:
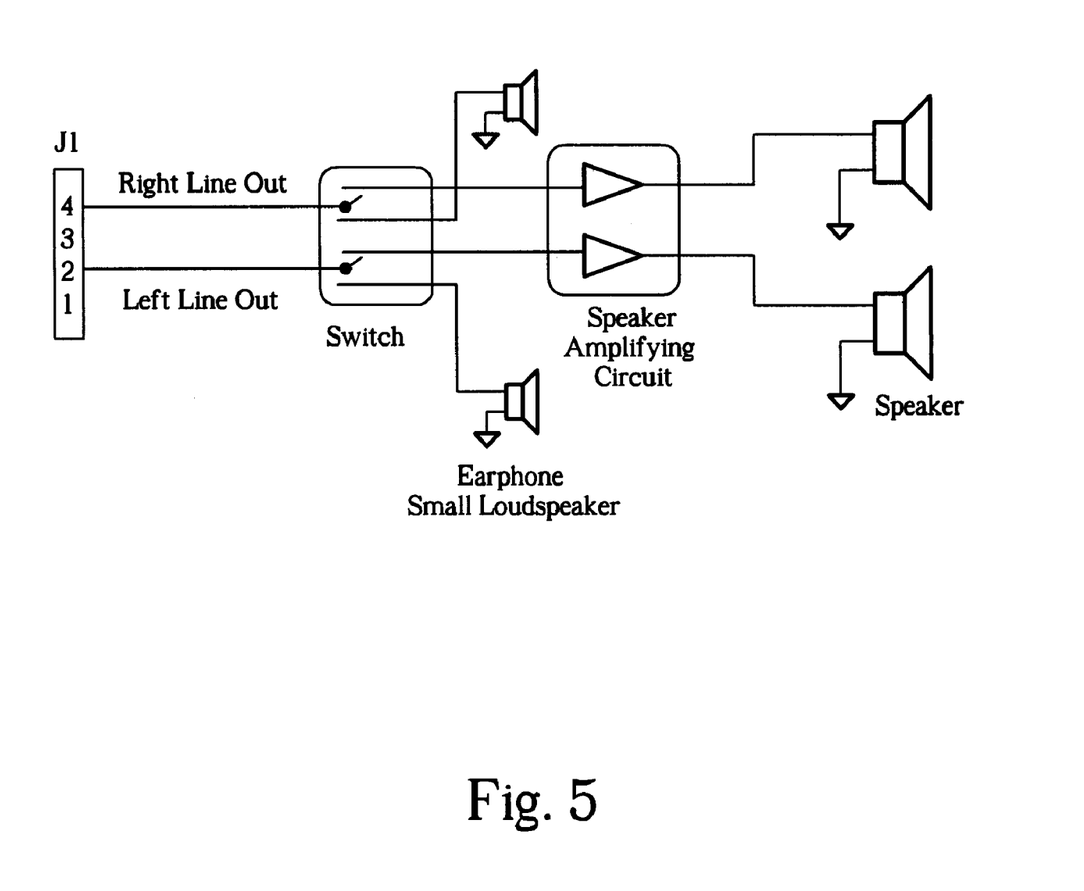
FIG. 5 is the circuit diagram of switching circuit, small loudspeaker and speaker combined with FIG. 4.
Figure 6A:
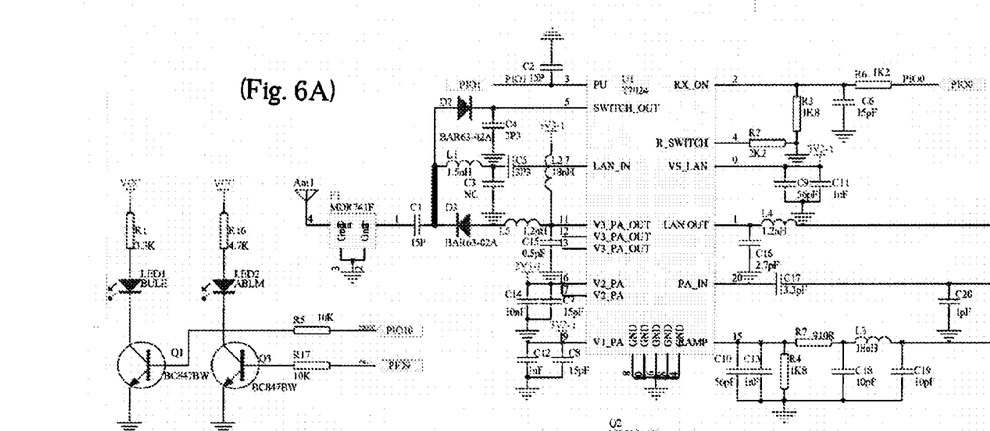
FIG. 6A is the magnified drawing of the part marked (FIG. 6A) of the FIG. 6.
Figure 6B:
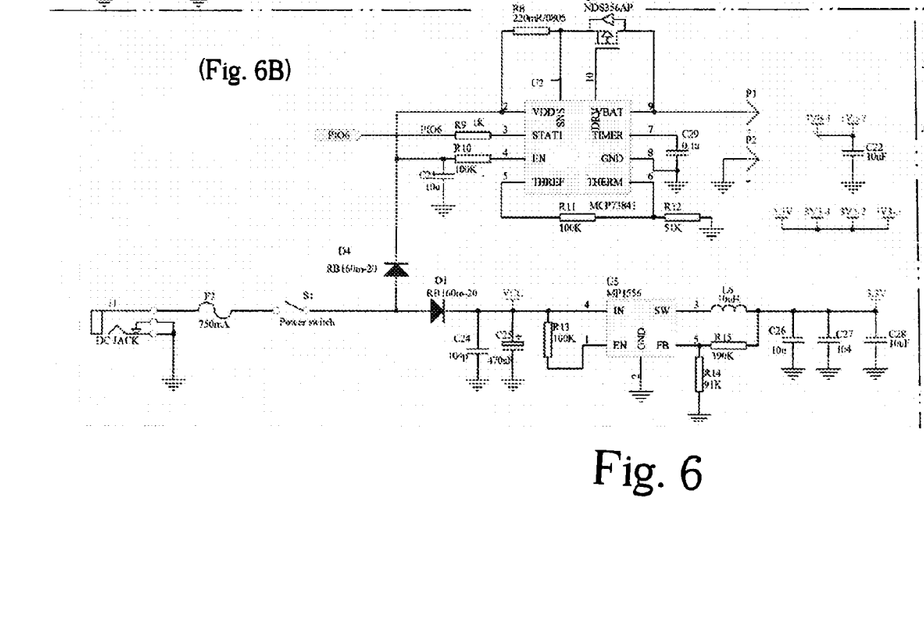
FIG. 6B is the magnified drawing of the part marked (FIG. 6B) of the FIG. 6.
Figure 6C:
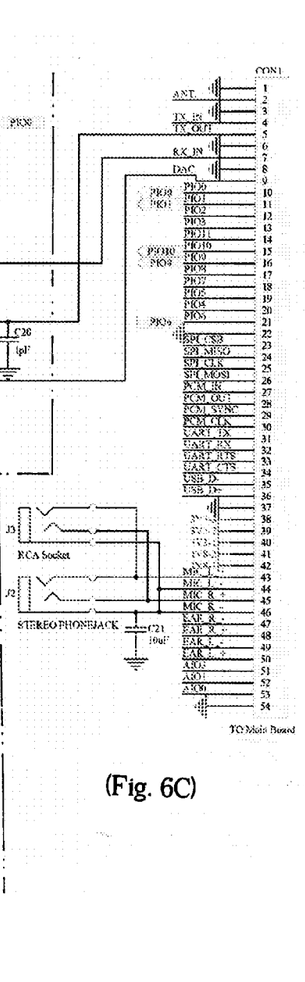
FIG. 6C is the magnified drawing of the part marked (FIG. 6C) of the FIG. 6.

FIG. 4 and FIG. 5 are the circuit diagrams of the Bluetooth earphone according to one preferred embodiment of the present invention. FIG. 6 is the circuit diagram of Bluetooth transmitter combined with the Bluetooth earphone.

The plug-in unit J1 in FIG. 6 is adapted to connect power supply; the plug-in unit J2 is an input terminal of music signals; the plug-in unit J3 is a signal input terminal of the fixed phone or mobile phone. CON1 in FIG. 6 is a plug-in unit used to plug a Bluetooth module. When assembled, the Bluetooth module (not indicated in the figure) is plugged into the plug-in unit CON1 directly. The Bluetooth module comprises A/D converter, which is adapted to convert the signals from J2 and J3 to digital signals. Then the signals are processed to corresponding data stream according to the Bluetooth protocol, and outputted to the RF circuit in FIG. 6 consisting of U1 (T7024 chip) and peripheral components. Finally, the data stream may be sent out through the antenna. U2 and peripheral components in FIG. 6 are control circuit utilized to control the charge of the battery.

As shown in FIG. 4, in the Bluetooth earphone, the signals received by the antenna are firstly output to the RF circuit consisting of U1 (T7024 chip) and peripheral components, then to the Bluetooth module (not indicated in the figure) plugged in CON1, where the signals are processed to generate original audio signals, and transmitted to the J1 in FIG. 5 through the J1 in FIG. 4. And then the switching circuit selectively output the audio signals to the earphone or the speaker to play. U2 and its peripheral components in FIG. 4 constitute a battery protection circuit. LED1 in the figure is a charging indicator, glittering when the battery is being charged, and continuously lighting after the charging is completed. LED2 is a connecting indicator. When the Bluetooth earphone is connected with the Bluetooth transmitter, LED2 continuously light, otherwise it goes out. S1 and S2 in the figure are volume control buttons and S3 is power switch.

According to FIG. 5, a double-pole-double-throw mechanical switch is utilized as the switching circuit. As the power amplifying circuit is the conventional technology, its detailed circuit diagram has not been shown. After the analog audio signals in FIG. 4 are output to the switch in FIG. 5, the switch may selectively output the audio signals to the small loudspeaker or the speaker amplifying circuit. The speaker amplifying circuit outputs the amplified signals to the speaker. Shown in this figure, a small loudspeaker and a speaker respectively having two channels are utilized.

With this Bluetooth earphone to listen to the music, users can select earphone mode or speaker mode. While listening to the music, if a call is coming in, the Bluetooth transmitter transmits corresponding ringing signal to the Bluetooth earphone. At this time, the microprocessor in the Bluetooth earphone (the microprocessor is built in the Bluetooth module) will shield the music signal and send out ring tone to prompt the user to answer the coming call. The user may enter the call mode by simply pressing corresponding answering key. Obviously, this Bluetooth earphone can be used as wireless phone, speaker and meeting phone etc.

What is claimed is:

1. A Bluetooth earphone, comprising a left ear muff, a right ear muff, and an intermediate connecting unit, further comprising a power supply unit, a Bluetooth receiving circuit, and small loudspeakers installed in the left ear muff and the right ear muff respectively, said left ear muff and said right ear muff being electrically connected through conducting wires installed in said intermediate connecting unit, characterized in: further comprising a speaker amplifying circuit, a switching circuit which selectively outputs input signals from an input terminal to its first or second output terminal, and a speaker installed in at least one said ear muff being connected with the output terminal of said speaker amplifying circuit; the output terminal of said Bluetooth receiving circuit being connected with said input terminal of said switching circuit; said first output terminal of said switching circuit being connected with said small loudspeakers and said second output terminal being connected with the input terminal of said speaker amplifying circuit, the switch circuit selectively output the audio signals to the small loudspeakers or the speaker amplifying circuit and the speaker amplifying circuit outputs amplified signals to the speaker and wherein further comprising an earphone amplifying circuit which is connected between the output terminals of said switching circuit and said small loudspeakers.

2. The Bluetooth earphone of claim 1, wherein said speakers which are connected with the output terminal of said speaker amplifying circuit are installed in said left ear muff and said right ear muff respectively.

3. The Bluetooth earphone of claim 1, wherein said speakers which are connected with the output terminal of said speaker amplifying circuit are installed in said left ear muff and said right ear muff respectively.

4. The Bluetooth earphone of claim 1, wherein further comprises a call identification circuit that is connected between the output terminal of said Bluetooth receiving circuit and the input terminal of said switching circuit for identifying communication signals and shielding other input signals while existing said communication signals, also comprises a Bluetooth transmitting circuit for transmitting voice signals and a microphone connected with the Blue transmitting circuit.

5. The Bluetooth earphone of claim 4, wherein said power supply unit, Bluetooth receiving circuit, Bluetooth transmitting circuit, earphone amplifying circuit, speaker amplifying circuit, switching circuit and microphone are put together in one said ear muff, or installed in said left ear muff and said right ear muff separately.

6. The Bluetooth earphone of claim 1, wherein further comprises a call identification circuit that is connected between the output terminal of said Bluetooth receiving circuit and the input terminal of said switching circuit for identifying communication signals and shielding other input signals while existing said communication signals, also comprises a Bluetooth transmitting circuit for transmitting voice signals and a microphone connected with the BLuetooth transmitting circuit.

7. The Bluetooth earphone of claim 6, wherein said power supply unit, Bluetooth receiving circuit, Bluetooth transmitting circuit, earphone amplifying circuit, speaker amplifying circuit, switching circuit and microphone are put together in one said ear muff, or installed in said left ear muff and said right ear muff separately.

\* \* \* \* \*